United States Patent [19]

Suzuki

[11] Patent Number: 4,749,301

[45] Date of Patent: Jun. 7, 1988

[54] REMOVABLE COUPLING DEVICE

[75] Inventor: Tsunehiko Suzuki, Tokyo, Japan

[73] Assignee: Matsui Walterscheid Ltd., Tokyo, Japan

[21] Appl. No.: 945,726

[22] Filed: Dec. 23, 1986

[30] Foreign Application Priority Data

Dec. 23, 1985 [JP] Japan .................................. 60-287669
May 10, 1986 [JP] Japan .................................. 61-105847

[51] Int. Cl.⁴ ..................... B25G 3/18; F16B 21/00; F16D 1/00
[52] U.S. Cl. ................................. 403/322; 403/325; 403/327; 403/359
[58] Field of Search ............... 403/322, 328, 326, 327, 403/359, 316, 317, 318, 325

[56] References Cited

U.S. PATENT DOCUMENTS

| | | |
|---|---|---|
| 2,192,844 | 3/1940 | Bean . |
| 3,279,835 | 10/1966 | Krohm . |
| 4,318,630 | 3/1982 | Herchenbach et al. ............. 403/322 |
| 4,431,334 | 2/1984 | Cleveland et al. ............. 403/328 X |
| 4,464,077 | 8/1984 | Herchenbach et al. ........ 403/325 X |
| 4,579,476 | 4/1986 | Post ................................. 403/322 |
| 4,639,162 | 1/1987 | Geisthoff et al. ............... 403/325 X |
| 4,639,163 | 1/1987 | Buthe et al. .......................... 403/322 |
| 4,641,990 | 2/1987 | Geisthoff ...................... 403/322 X |
| 4,643,472 | 2/1987 | Schukei et al. ................. 403/322 X |
| 4,645,372 | 2/1987 | Suzuki ............................ 403/322 X |

FOREIGN PATENT DOCUMENTS

| | | |
|---|---|---|
| 3340130 | 3/1985 | Fed. Rep. of Germany . |
| 3511577 | 10/1986 | Fed. Rep. of Germany . |
| 1563857 | 4/1969 | France . |
| 61-52420 | 7/1986 | Japan . |
| 61-41017 | 7/1986 | Japan . |

Primary Examiner—Andrew V. Kundrat
Attorney, Agent, or Firm—Sughrue, Mion, Zinn, Macpeak & Seas

[57] ABSTRACT

A removable coupling device comprising a boss member with a central axial hole and radial holes opening into the axial holes containing locking balls which engage with a circumferential set groove of a shaft inserted into the axial hole. The boss member has inclined surfaces sloping radially inwardly and away from the apertures. An axially movable set ring selectively forces the balls, into the holes and has a spring ring engaged with a groove of the set ring and radially inwardly presses the inclined surface so that the set ring automatically returns to the position in which the balls lock the shaft.

17 Claims, 12 Drawing Sheets

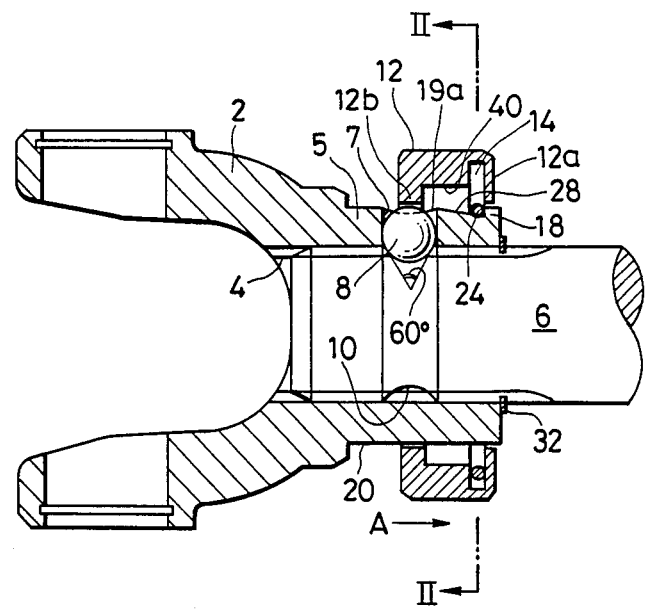

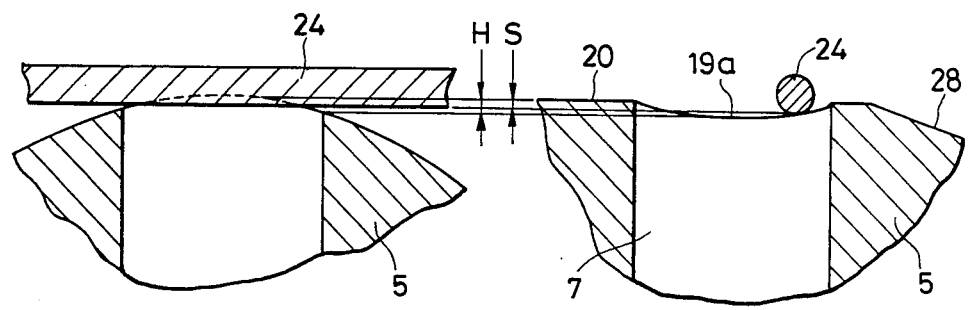
FIG. 18
FIG. 17
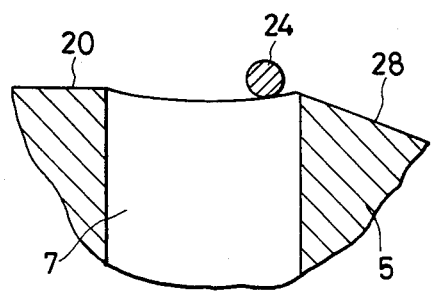
FIG. 19
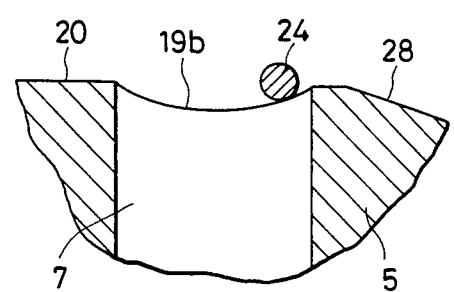
FIG. 20

REMOVABLE COUPLING DEVICE

BACKGROUND OF THE INVENTION

1. Field of the Invention

The present invention relates to a removable coupling device. More particularly, it relates to removable coupling devices in which a shaft is insertable into a boss member having radially movable locking elements to lock the shaft.

One type of removable coupling device comprises a boss member having a hole axially extending inwards and apertures radially extending to open in the hole. A shaft having a set groove circumferentially extending in an outer surface thereof is fitted into the hole of the boss member. Locking elements are radially movably disposed within the respective apertures of the boss member such that the locking elements can extend partly inwards from the apertures so as to engage with the set groove of the shaft to thereby prevent the shaft from escaping from the hole of the boss member. A set ring is axially movably disposed on the boss member to keep the locking elements at either a locking position where their locking elements are engaged with the set groove of the shaft or at a connectable and disconnectable position where the locking elements are disengaged from the set groove so as to be movable radially outwards.

Coupling devices of this type have advantages in that, when the shaft is inserted into the boss member, the shaft can be inserted without holding the set ring and can be automatically kept at the lock position if the set ring on the boss member is axially slidably moved. An additional advantage is that, when the shaft is removed from the boss member, the shaft can be removed form the boss member without holding the set ring if the set ring is axially slidably moved. Accordingly, for example, in the case where the coupling device of this type is used to drive agricultural machinery to be connected to a tractor through a motive power transmission shaft, the device is useful for the connection between a boss member having a universal joint yoke and an output shaft of the tractor or the connection between the boss member and an input shaft of the agricultural machinery. On the other hand, in the case where a tractor merely pulls a car or the like, a shaft of the tractor can be removably connected to a shaft of the car by the device. Furthermore, the device can be used as a coupling device for connecting and disconnecting pipes such as fire hoses or the like or can be used as as coupling device for establishing scaffolding for building construction.

Although shafts for transmitting rotational motive power are used in various kinds of machines, the shafts are difficult to handle in connecting and disconnecting operations and often cause danger because the joint portion thereof is generally disposed at a narrow portion and/or because covers are provided to prevent stain. In order to solve such problems, various kinds of devices for safely, securely and speedily performing the connection of the shafts have been proposed. Among those proposals, such a coupling device as described above in the head portion, in which the connection and disconnection of the shaft can be easily made by axially moving the set ring when the shaft is inserted into or removed from the boss member, has been proposed in the specification and drawings initially appended to the request of an application of each of Japanese Patent Unexamined Publication Nos. 41017/1986, 52420/1986 and 84410/1986 and Japanese Patent Application No. 118949/1985 (corresponding to U.S. Patent Application Ser. No. 779,268, filed Sept. 23, 1985).

However, those proposed devices are disadvantageous in that many parts are required, the structure is complex, a long time is required for assembling the coupling device, and high cost is required for manufacturing the coupling device.

Reference is also made to a removable coupling device having similarities to these described in Japanese Patent Application 260058/85.

SUMMARY OF THE INVENTION

It is therefore an object of the present invention to provide a reliable removable coupling device in which the connection and disconnection of the shaft can be made by a simple operation of axially moving the set ring, and in which the parts can be reduced in number and the structure can be simplified to thereby perform the connection and disconnection of the shaft safely, securely and speedily.

Accordingly, to the present invention, the coupling device is generally of the type as described above. Inclined surfaces are formed on an outer surface of the boss member so as to decrease a diameter of the boss member as the inclined surfaces extend axially away from the apertures. A spring ring is provided so as to partially engage with the groove at an inner surface of the set ring. The spring ring has contracting force and is in forced contact with the boss member. Thereby the spring ring slides on the inclined surfaces of the boss member so that the set ring is automatically returned from the connectable and disconnectable position to the locking position when the shaft is inserted into or removed from the hole of the boss member.

In the above-described arrangement, the set ring is held by one hand and the spring ring, engaged with the end of the inclined surfaces at the locking position by contracting force, is axially slid on the inclined surfaces to the area of the apertures of the boss member. As a result of sliding on the inclined surface, the spring ring is spread against axial components of force produced by a cam function owing to the engagement of the spring ring with the inclined surfaces. The tightening force of the spring ring increases to thereby hold the set ring containing the spring ring at the area of the apertures of the boss member so that a connectable and disconnectable position where the locking elements are enabled to move outwards can be reached. If the shaft is inserted into or drawn from the hole of the boss member, the locking elements move out of the set groove of the shaft so that the spring ring is pressed or spread by the locking elements and reaches the inclined surfaces of the boss member. If the shaft is further inserted into or further drawn from the hole of the boss member, the spring ring slides down on the inclined surfaces by the axial component of force owing to the cam function and reaches the end of the inclined surfaces so that the set ring carried by the spring ring is automatically returned to the lock position.

Accordingly, the set ring is kept at the connectable and disconnectable position by moving the set ring to the area of the apertures linked to the inclined surfaces of the boss member, so that it is possible to perform connection and disconnection between the shaft and the boss member merely by pushing or pulling the set ring attached to the boss member with respect to the shaft.

BRIEF DESCRIPTION OF THE DRAWINGS

FIGS. 1 to 6 show a first embodiment of the coupling device according to the invention, in which FIG. 1 is a sectional view of the device.

FIG. 2 is a cross-sectional view taken along the line I—I of FIG. 1.

FIG. 3 is a view showing a spring ring.

FIGS. 4 and 6 are views for explaining the steps of operation.

FIG. 5 is a cross-sectional view taken along the line II—II of FIG. 4.

FIGS. 17 to 23 are views showing there condition that a spring ring engages with the area of apertures of a boss member.

DETAILED DESCRIPTION OF THE PREFERRED EMBODIMENTS

Figure 4:
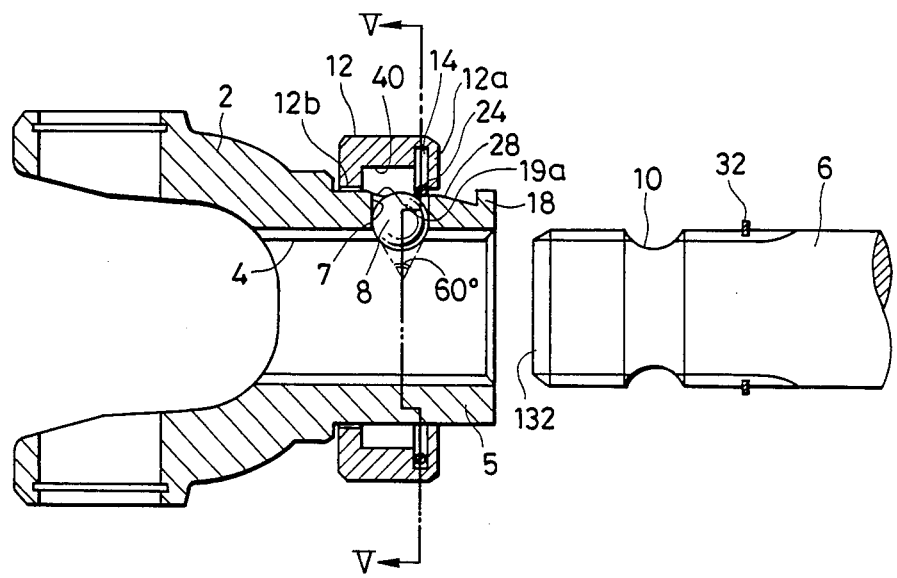

The removable coupling device according to the present invention will be described in reference to a case where the device is applied to connection between an output shaft of a tractor and a boss member having a universal joint yoke coupled to an agricultural machine driven by the tractor, but the invention is not limited thereto. For example, the invention is applicable to various cases such as connection between fire hoses, connection between oil or air pipes of hydraulic or pneumatic appliances, connection for establishing scaffolding for building construction, and the like.

An embodiment according to the invention will be described in detail with reference to the drawings.

Referring to FIGS. 1 to 6, there is shown a removable coupling device for connecting a splined output shaft 6 of a tractor to a boss member having an universal joint yoke to drive an agricultural device coupled to the tractor through the universal joint. As shown in FIG. 1, the coupling device includes a boss member 5 provided with a joint yoke 2, a central hole 4 axially extending for receiving the shaft 6 into the boss member 5, and three apertures 7 radially extending and opening into the central hole 4. Locking elements or balls 8 are disposed within their respective apertures 7 and extend partially radially inwards from the apertures 7 so as to be engaged with a set groove 10 formed in the shaft 6 so that the shaft 6 cannot be removed from the boss member 5.

The boss member 5 is formed like a cylinder. Inclined surfaces 28 are formed at three circumferentially equidistantly separated places on the outer surface of the boss member 5. The inclined surfaces 28 extend axially starting from positions corresponding to the end of the respective aperture 7 axially to the end of the boss member 5 so as to decrease the diameter of the boss member 5 as the inclined surfaces are axially far from the respective aperture 7. The boss member 5 may be formed like a polygonal pillar. The inclined surfaces 28 are disposed circumferentially substantially corresponding to the apertures 7. The length, the width and the taper angle of the respective inclined surface 28 can be suitably established in accordance with the conditions required.

A set ring 12 is axially movably disposed on a cylindrical portion 20 of the boss member 5. The set ring 12 is formed in a U-shape cross section having legs 12a and 12b at the opposite axial ends. One of the legs 12a is provided with a groove 14 formed in its inner surface. A substantially triangular spring ring 24, shown in FIGS. 2 and 3, has a slit 33, flat portions 50 and corner portions 51 as shown in FIG. 3 and has inwards contracting force. The flat portions 50 of the spring ring 24 are in forced contact with the inclined surfaces 28 of the boss member 5. Other portions including the corner portions 51 of the spring ring 24 are received in the groove 14. Because the spring ring 24 disposed in the spread state has inwards contracting force, the set ring 12 at the locking position shown in FIG. 1 abuts on a stopper 18 provided at the axial end of the inclined surfaces 28. The spring ring 24 exerts bias or moves the set ring 12 in the outer axial direction (that is, in the direction of the arrow A of FIG. 1) owing to the cam function produced when the flat portions 50 slide down on the inclined surfaces 28 and this force acts on the set ring 12. Accordingly, the movement of the set ring 12 in the axial direction (that is, in the direction opposite to the arrow A of FIG. 1) is prevented by the inclined surfaces 28 and the spring ring 24. In this condition, the other leg 12b of the set ring 12 is located in the area of the apertures 7 and supports the balls 8 so that the balls 8 cannot move radially outwards from the apertures 7.

Figure 5:
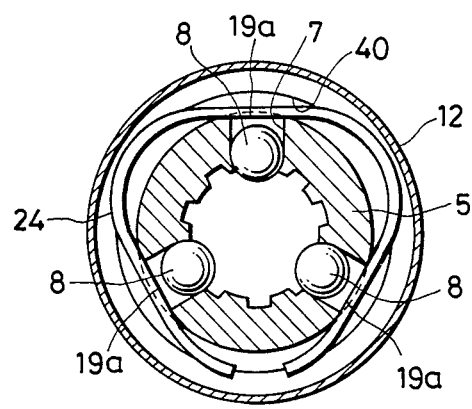

The circumferential phase relation between the spring ring 24 and the inclined surfaces 28 or apertures 7 of the boss member 5 is shown in FIGS. 2 and 5 in the locking and the connectable and disconnectable positions respectively. Although this embodiment employs a substantially triangular spring ring, the number of apertures in the boss member, the shape of the polygonalpillar-like portion corresponding to the apertures, the number of inclined surfaces, the shape of the spring ring engaged with the inclined surfaces, and the number of flat portions or concavities as described later are not limited to the illustrated embodiment. However, it is preferable to provide them at three places or more as shown in FIGS. 1 to 6 for the purpose of stability. Furthermore, the inclined surfaces may be provided at the side of the joint yoke (that is, at the left side of the apertures 7 in FIG. 1).

The spring ring 24 is annularly shaped and has spring force. Although the spring ring may be made double or more, it is preferable to make the spring ring single as shown in FIGS. 1 to 6 for the purpose of saving space.

Although the sectional form of the spring ring 24 may be freely designed, it is generally preferable to make the shape circular in view of the fact that the spring ring 24 should slide on the inclined surfaces 28.

The spring ring 24 may be made of a steel material, such as spring steel or the like, or an elastic organic material, such as Nylon or the like. Although the shape of the respective ball 8 may be a polyhedron, such as a roller, an arched roller or the like, it is preferable to make the ball 8 spherical at least at its one end for the engagement with the ball set groove 10 of the splined shaft 6. The other end of the respective ball 8 may be shaped like a cylindrical pillar as long as it can be engaged with the ball-stopper support or flange 30 of the set ring 12. However, it is the most inexpensive to use balls available on the market.

The respective balls 8 may be made of steel or may be made of plastic material which is resistant against abrasion. Although the number of the balls 8 may be one or two, it is preferable to use three balls as illustrated in the aforementioned embodiment for the purpose of stability. Furthermore, in order to limit the depth of insertion of the splined shaft 6, it is preferable to also provide a shaft stop ring 32 on the splined shaft 6.

Figure 6:
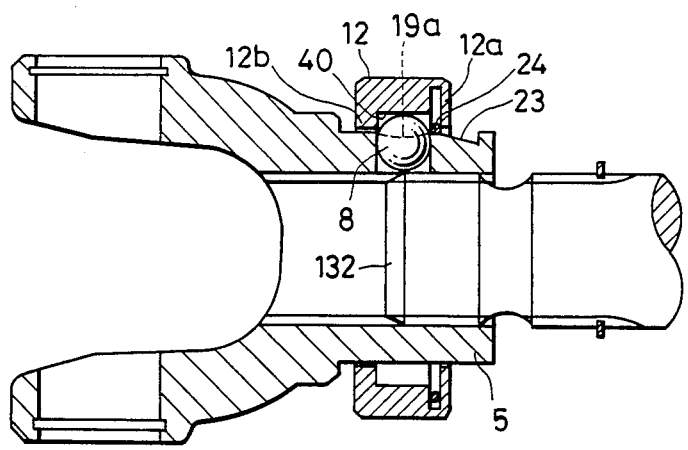

The operation in which the shaft 6 is connected to the boss member 5 is shown successively in FIGS. 4 and 6. First as shown in FIG. 4, the set ring 12 is axially moved against the axial force component produced by the pressure between the spring ring 24 and the inclined surface 28, so that concavity 40 of the set ring 12 between the legs 12a and 12b respectively reach a position on the apertures 7 of the boss member 5.

At this position, the spring ring 24 engages within a "concavity" 19a formed at the apertures 7 in the cylindrical boss member 5 so that the set ring 12 is kept axially unmovable. These concavities 19a are formed around the apertures 7 by removing a circular arc portion of the boss member 5 so that the flat portions 50 of the spring ring 24 engage a depression. To prevent the balls 8 from coming off into the hole 4 of the boss member 5 under this condition, the inner radial end of the respective aperture 7 for receiving the ball is reduced in diameter. For example, the respective aperture 7 has an inner surface of a solid angle of 60 degrees. When the shaft 6 is inserted into the central hole 4 of the boss member 5 in this state, the balls 8 are moved radially outwards within the apertures 7, as shown in FIG. 6, so that the balls 8 partially extend toward the concavity 40 of the set ring 12. In this case, the spring ring 24 engaging with the "concavity" 19a of the boss member 5 is spread by the balls 8 to thereby release the engagement of the spring ring 24 with the aperture "concavity" 19a, so that the set ring 12 is moved a little to the right. Accordingly, the spring ring 24 is engaged with the inclined surfaces 28 but the leg 12b of the set ring 12 is engaged with the balls 8. As a result, the set ring 12 cannot move any more to the right. When the shaft 6 is further deeply inserted into the hole 4, the set groove 10 of the shaft 6 reaches the apertures 7 to thereby allow the balls 8 to be movable inwards. Accordingly the balls 8 are pressed inwards by the leg 12b of the set ring 12 owing to the retrieving force which is produced by the cam function of the inclined surfaces 28 engaged with the spring ring 24 and which acts on the set ring 12 to move axially. As a result, the balls 8 extend partially out of the apertures 7 and engage with the set groove 10 to thereby eliminate the function of preventing the retrieval of the set ring 12, so that the set ring 12 is automatically returned to the locking position as shown in FIG. 1.

The procedure of removing the shaft 6 from the boss member 5 is similar to the procedure of connecting them, and accordingly, detailed description will be omitted. In removing the shaft 6, the set ring 12 is moved to the position shown in FIG. 4 whereafter the shaft 6 is drawn from the boss member 5. At this time, the balls 8 are moved radially outwards within the apertures 7 by the cam function of the U-shaped surface of the set groove 10 of the shaft 6 as shown in FIG. 6.

Thereafter the set ring 12 is automatically returned to the position shown in FIG. 1 so that the shaft 6 is disconnected from the boss member 5.

Figure 7:
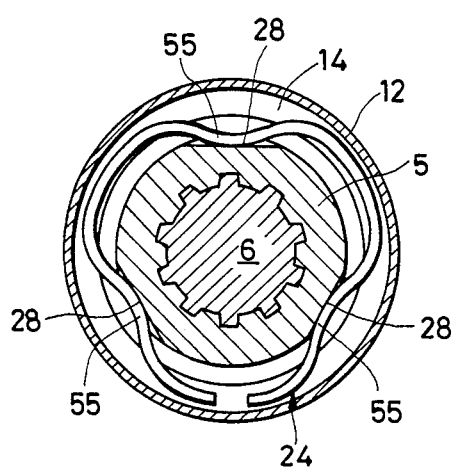
FIGS. 7 and 8 are views showing a second embodiment in which a spring ring having another form is used.
Figure 8:
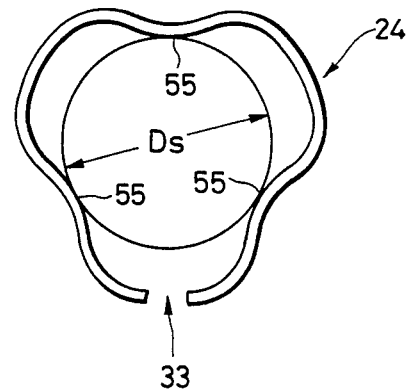

FIGS. 7 and 8 show another embodiment, which is different in that the substantially triangular spring ring 24 used in FIGS. 1 to 6 is replaced by a substantially circular spring ring 24 having a slit 33 and three inwards extending bends 55, the spring ring 24 having contracting force and being disposed on the boss member 5. The bends 55 of the spring ring 24 are in forced contact with the inclined surfaces 28, and other portions are housed in the groove 14 at the inner surface of the leg 12a of the set ring 12. Because the bends 55 of the spring ring 24 slide on the inclined surfaces 28 so as to be located in the smallest-diameter portion of the boss member, the set ring 12 can be stably kept at the locking position.

Figure 9:
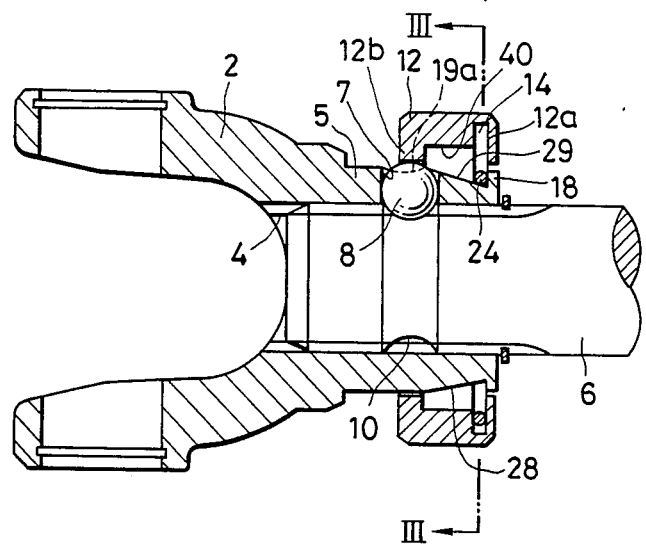
FIGS. 9 to 11 are views showing a third embodiment of the coupling device.
Figure 10:
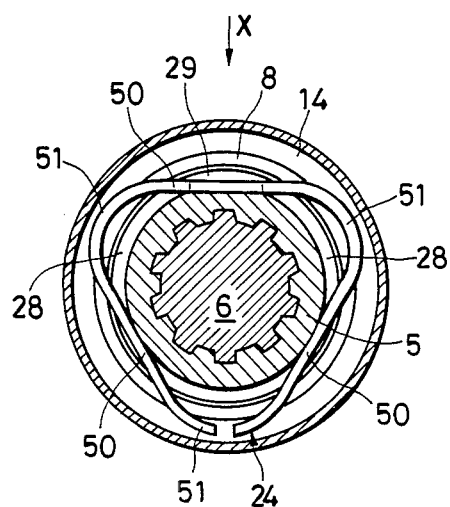
Figure 11:
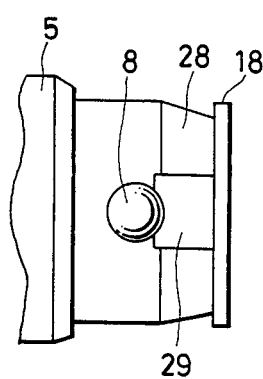
Figure 12:
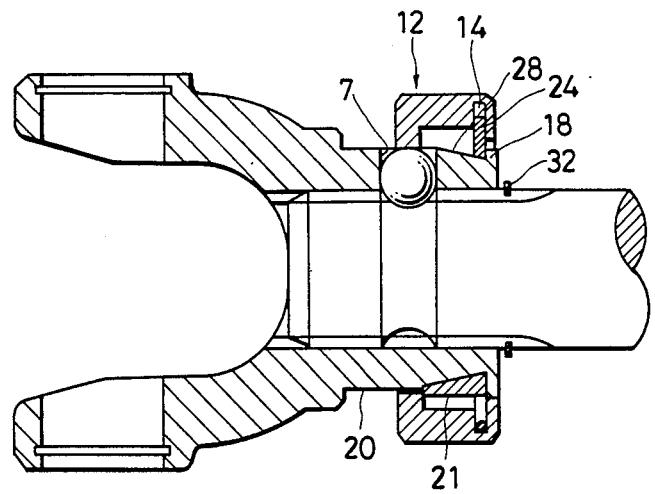
FIGS. 12 to 16 are views showing a fourth embodiment.
Figure 13:
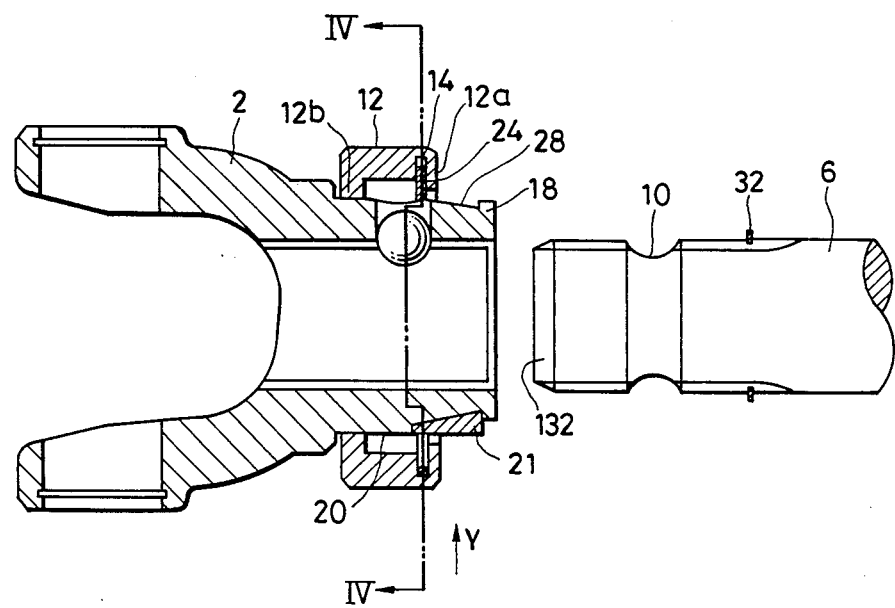
Figure 14:
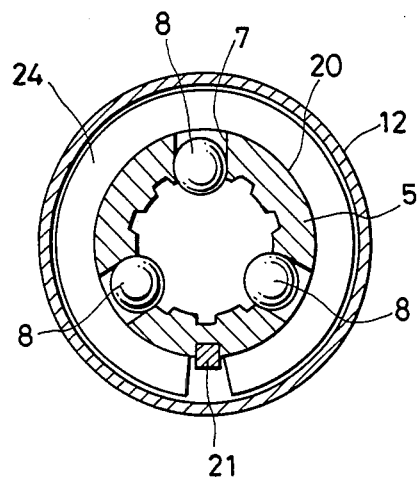
Figure 15:
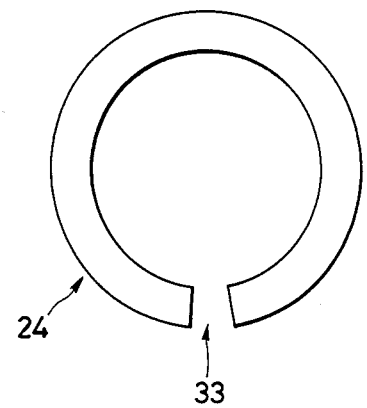
Figure 16:
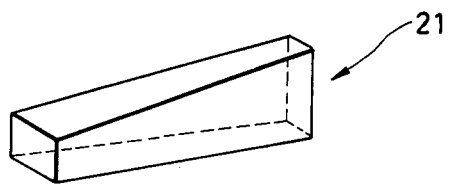

FIGS. 9 to 11 show a further embodiment which is similar to the embodiment shown in FIGS. 1 to 6 but different in that the inclined surfaces 28 provided on the boss member 5 are formed respectively to be conical surfaces. In short, the inclined surfaces of the boss member 5 are formed as conical surfaces 28 entirely circumferentially formed on the boss member 5. The respective conical surface 28 extends starting from the end of the aperture 7 to the stopper 18 provided at an end of the boss member 5. The respective conical surface 28 may be formed so as to overlap the aperture 7. In this case, in order not to locate the corner portions 51 of the spring ring 24 on the aperture 7 at the connectable and disconnectable position of the set ring (see FIG. 4), a planar guide surface 29 (FIGS. 10 and 11) is provided at a place on the respective conical surface 28 to prevent the rotation of the spring ring 24 with respect to the boss member 5. The guide surface 29 is a flat surface formed in parallel to the respective conical surface 28 so as to be continued to the conical surface 28 through a stepped portion, and the guide surface 29 extends to the stopper 18 or beyond the area of the stopper 18. In this embodiment the boss member 5 may be formed like a cylindrical pillar or like a polygonal pillar.

FIGS. 12 to 16 show further embodiment which is similar to the embodiment of FIGS. 9 to 11 in that all three inclined surfaces are formed as conical surfaces 28 entirely circumferentially formed on the boss member 5. The spring ring 24 is formed as a circular ring having a partly open slit 33. Furthermore, an axial guide 21 (shown separately in FIG. 16) is provided on an outer surface of the boss members 5 in the area of the inclined surface 28 and extends to the cylindrical portion 20. The axial guide 21 is shaped so that it presents an upper surface parallel to the axis of the boss member 5. The slit 33 is engaged with the guide 21 in order to prevent the rotation of the spring ring 24 on the boss member 5 so that the slit 33 cannot be located on the aperture 7 It is apparent from FIGS. 12 to 16 that the guide surface widens toward the side of the aperture 7 as it axially extends to the area of the aperture 7. At the connectable and disconnectable position of the set ring 12 which has been manually moved in the axial direction, the spring 24 attempts to contract itself on the cylindrical portion 20 of the boss member 5 so that the set ring 12 is kept at the position by the tightening force of the spring ring 24. When the ball 8 is moved outwards by the insertion or withdrawal of the shaft 6, the ball 8 presses the spring ring 24 to be located on the inclined surface 28. In this case, because the leg 12b of the set ring 12 engages with the ball 8 similarly to the embodiment of FIGS. 1 to 6, the set ring 12 is kept at the position as long as the insertion or withdrawing of the shaft 6 is not completed.

In the following, the condition in engagement of the spring ring 24 with the boss member 5 at the connect-/disconnect position is explained. FIGS. 17 and 18 show an embodiment in which the pillar portion 20 partially or entirely circumferentially formed in the area of the apertures 7 of the boss member 5 is cylindrically formed. FIG. 17 is an axial sectional view showing a condition where the spring ring 24 engages with the boss member 5 at its aperture 7. FIG. 18 is a radial sectional view showing the condition. Concavities 19a are spontaneously formed by the provision of the apertures 7 in the cylindrical portion 20. The reference symbol H represents the total depth of the respective concavity 19a formed by the aperture 7 and S represents the depth for engagement with the spring ring 24. The inclined surfaces 28 may be formed so as to be overlapped with the apertures 7 or in other words the inclined surfaces 28 may be formed to start from the area of the apertures 7 as shown in FIG. 19. Furthermore, concavities 19b as shown in FIG. 20, having a total depth more than the total depth of the concavities 19a formed by the apertures 7 may be provided in the area of the apertures 7 on a partial or entire circumference of the cylindrical portion 20.

Figure 21:
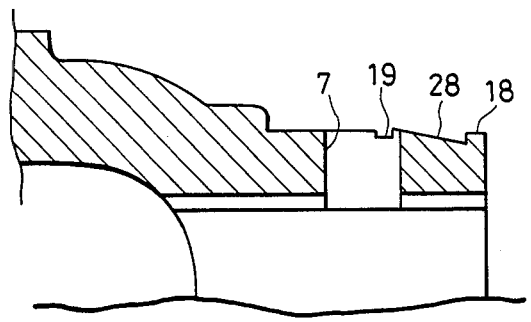
Figure 22:
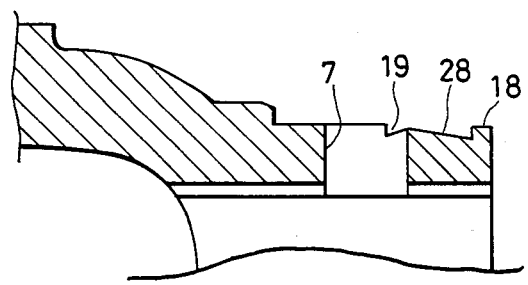
Figure 23:
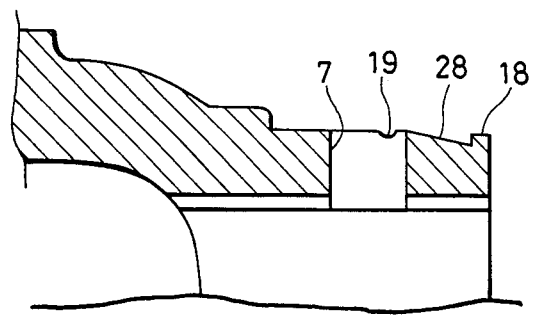

FIGS. 21 to 23 show the form of a cut portion 19 engaging with the spring ring 24 in order to keep the set ring 12 at the connect/disconnect position. FIGS. 21 to 23 are slightly different from each other in the form. The respective cut portion 19 is partially or entirely circumferentially provided in the area of the apertures 7. The inclined surfaces 28 are continued to the end of the apertures where the cut portions 19 exist. However, the set ring 12 generally can be sufficiently kept at the connectable and disconnectable position by the spring ring 24 through both the tightening force of the spring ring with respect to the boss member 5 and the frictional resistance owing to the surface roughness of the boss member 5. Accordingly, the concavities 19b and the cut portions 19 can be used as means useful in the case where the set ring 12 should be more strongly kept at the connectable and disconnectable position.

Figure 24:
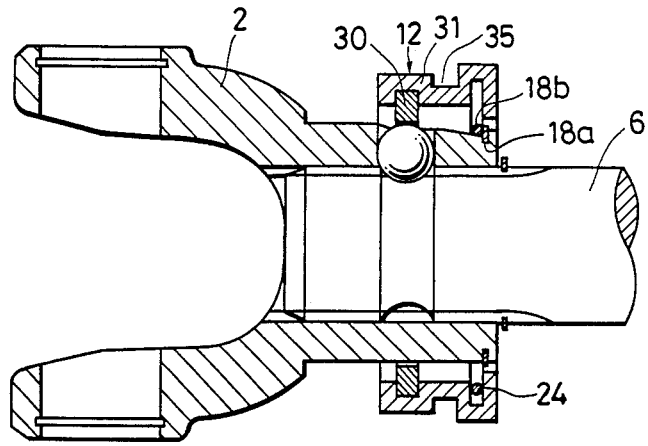
FIG. 24 is a view showing a fifth embodiment in which the set ring is different from that used in FIGS. 1 to 6.

FIG. 24 shows a further embodiment which is similar to the embodiment of FIGS. 1 to 6 but different in the structure of the set ring 12. In this embodiment the set ring 12 comprises a support 30 for supporting the balls 8 at the locking position and a sleeve-like casing 31 for holding the support 30. The support 30 and the casing 31 are formed separately form each other. The support 30 and the casing 31 may be made of steel, hard upper, plastic or the like, or may be made of a combination thereof. To perform nonskid hand operation, a groove or concavity 35 is formed on the outer surface of the set ring 12.

Although the stopper 18 provided at the inclined surface 28 may be integrally formed on the boss member 5, the stopper 18 may comprise a groove 18a provided at the inclined surface 28 and a snap ring 18b engaging with the groove 18a as described in this embodiment. The snap ring 18b can employ snap rings available on the market.

Figure 25:
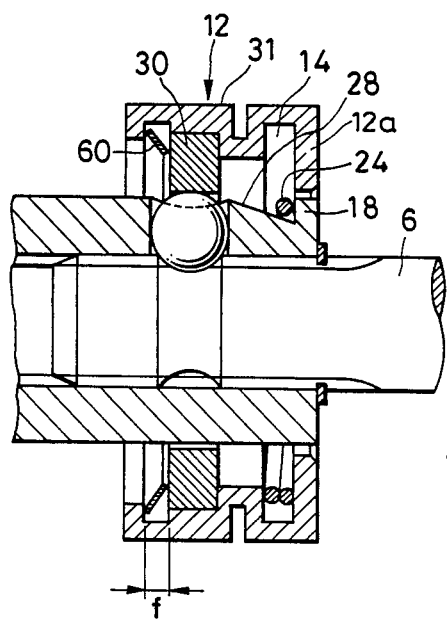
FIGS. 25 and 26 are views showing a sixth embodiment in which a concave spring is provided.
Figure 26:
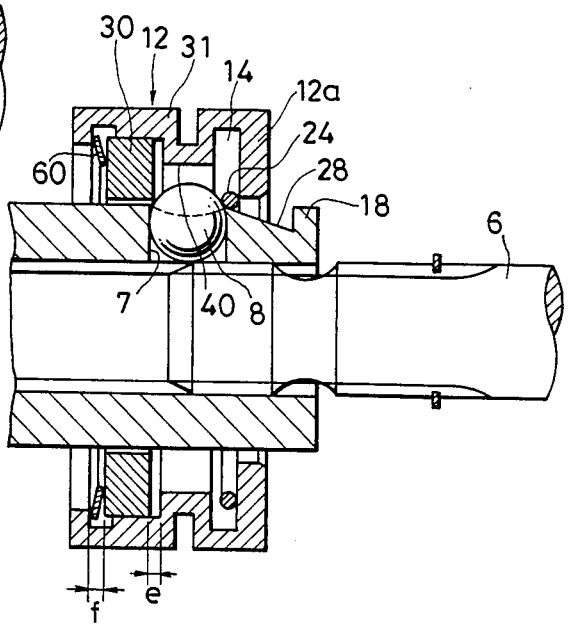

FIGS. 25 and 26 show an embodiment similar to the embodiment of FIG. 24, in which the set ring 12 comprises a support 30 and a sleeve-like casing 31 for holding the support 30. In this embodiment, a spring having axially spreading force, for example, a concave spring 60, is interposed between the joint yoke 2 side end of the casing 31 and the support 30 axially movably disposed within the casing 31. In this case, the concave spring 60 is contracted when the shaft is inserted into or drawn from the boss member. Accordingly, the support 30 is moved by a distance e such that the distance between the end of casing 31 and the support 30 is changed form f to f - e. Accordingly, it is possible to shorten the operational stroke of the set ring 12 and minimize noise and abrasion owing to shocks and vibrations.

Figure 27:
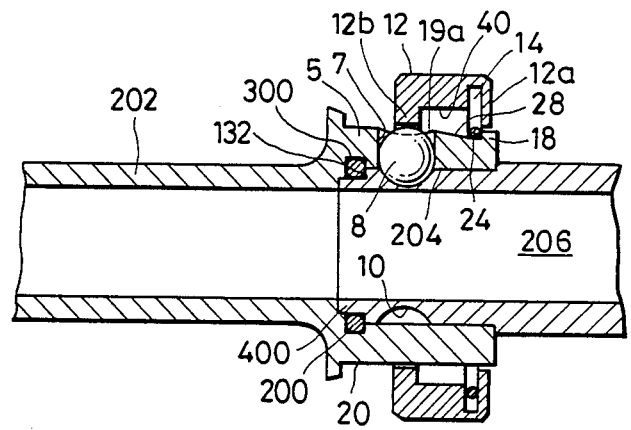
FIGS. 27 and 28 are views showing a modification of FIGS. 1 to 6 which are applied to the connection of pipes.
Figure 28:
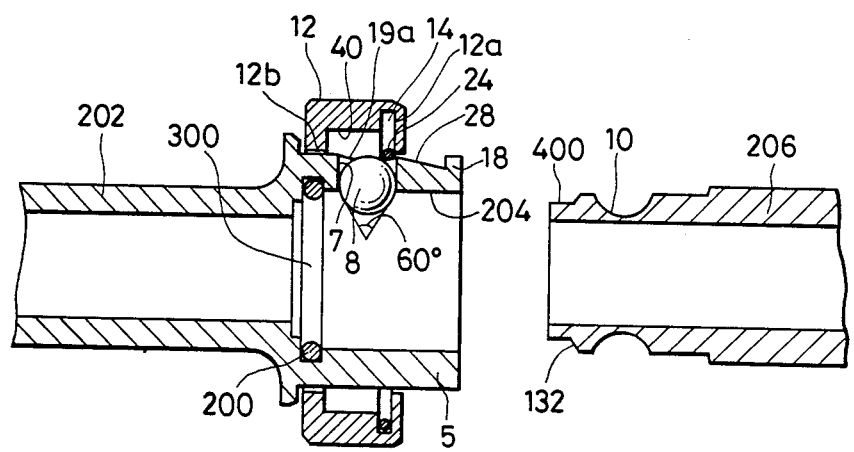

FIGS. 27 and 28 show a modification of the coupling device shown in FIGS. 1 to 6, as an example in which the invention is applied to the connection of pipes. FIG. 27 corresponds to FIG. 1, and FIG. 28 corresponds to FIG. 4. The modification is different from the embodiment shown in FIGS. 1 to 6 in that: (1) the joint yoke 2 is replaced by a female pipe 202; (2) the splined hole 4 is replaced by a non-splined hole 204; (3) the shaft 6 is replaced by a male pipe 206; and (4) a groove 300 is formed in the inner surface of the boss member 5 so as to accomodate a seal 200 in the groove 300. As a result, the seal 200 is surrounded by and urged against a chamfered portion 132 and a small-diameter portion 400 of the male pipe 206 and the inner surface groove 300 of the boss member 5 under the connecting condition to thereby prevent fluid leakage.

If the embodiment is applied to the connection of pipes for establishing scaffolding for building construction, it is a matter of course that the groove 300 at the inner surface of the boss member 5, the seal 200, and the small-diameter portion 400 of the male pipe 206 become unnecessary because the prevention of fluid leakage is not required. Furthermore, in the case where the pipes should be vertically disposed, the setting condition may be changed into such a direction that the set ring can be kept at the locking position if a person steps on the set ring. In short, the right side in FIG. 27 may be changed to the bottom and the left may be changed to the top (so that the male pipe is disposed at the bottom and the female pipe is disposed at the top).

The other arrangement, connecting and disconnecting procedure, and operations are the same as those described above, and description thereof will be omitted.

Figure 29:
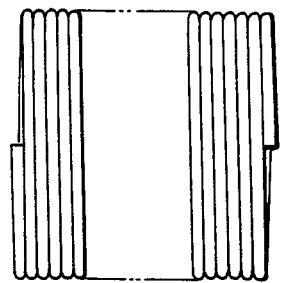
FIGS. 29 to 36 are views for explaining the spring ring.
Figure 30:
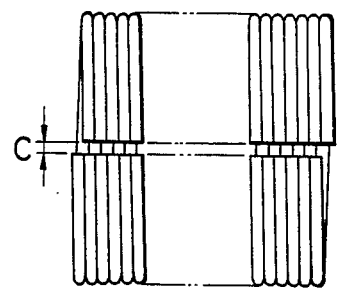
Figure 32:
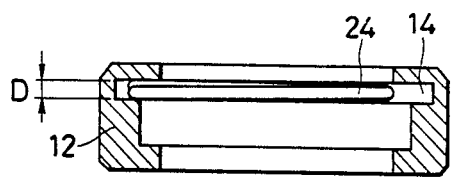
Figure 33:
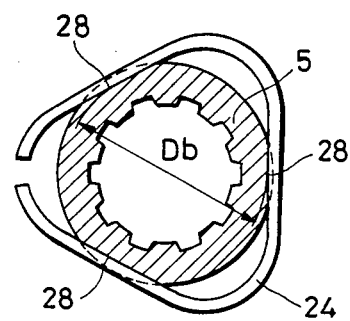

From the description made above, it is apparent that all the embodiments of the present invention are applicable to the connection of pipes The spring ring, formed in the form of an annular spring having radially contracting force and axially spreading force and used in the foregoing embodiments, will be described in detail hereunder. The annular spring of this type is produced by the steps of, as shown in FIG. 29, winding a wire rod on a base, such as a triangular, a polyangular or a circular base, as shown in FIG. 30, machining a slit as shown by the symbol C. In this case, the shape in cross section of the wire rod is not limited to be circular, but any shape can be suitably selected. Accordingly, such a spring ring as having an axially staggered slit as shown by the symbol B in FIG. 31 can be manufactured, and, furthermore, the degree of the axial staggering can be suitably selected. If such a spring ring 24 is inserted into the groove 14 of the set ring 12 (FIG. 32), the spring ring has spreading force in the axial direction because the width D of the groove 14 is smaller than the width B of the spring ring 24. Furthermore, if such a spring ring 24 is assembled together with the set ring 12 into the boss member 5 while spreading the spring ring 24, the spring ring has radially contracting force because the internal diameter $D_s$ of the spring ring 24 in the free state or connectable and disconnectable condition is smaller than the minimum diameter $D_b$ of the boss member 5 at the inclined surface 28 (see FIGS. 3 and 33). Accordingly, the spring ring 24 can be exactly stably fitted in the groove 14 of the set ring 12 to thereby be kept in such a state that the spring ring cannot axially move on the boss member 5. Accordingly, noise and abrasion owing to shock and vibration can be prevented from occurring. Furthermore, in the case where the shaft 6 is inserted into or drawn from the boss member at the connectable and disconnectable position, the respective ball 8 moves radially outwards within the aperture 7. Thereafter, the ball 8 partially extends in the concavity 40 of the set ring 12 to thereby press the spring ring 24 engaged with the boss member 5 at the area of the aperture 7. Accordingly, the engagement of the spring ring 24 in the area of the aperture 7 is released so that the spring ring 24 is engaged with the inclined surface 28. However, because the leg 12b of the set ring 12 is engaged with the ball 8, the shaft cannot move if the shaft is not inserted or drawn any more. In this case, the spring ring 24 is pressed by the ball 8 so that the width of the spring ring 24 is reduced compared with the width D of the groove 14 and becomes flat. Accordingly, the axially staggered quantity of the slit is changed but the set ring 12 does not move Accordingly, an advantage in practical design exists in that the axial size can be reduced by the axially staggered quantity of the slit. Although the spring ring 24 is radially spread within the groove 14 of the set ring 12 corresponding to the change of the diameter size of the boss member 5 at the inclined surfaced 28 and the pillar portion 20, radially contracting force increases or decreases with the increase or decrease of the radially spreading distance. At this time, the axially staggered distance of the slit increases or decreases. However, because the width of the spring ring 24 is controlled by the width D of the groove 14, axially spreading force of the spring ring 24 acting on the groove 14 increases or decreases. In short, the axially spreading force is changed in proportion to radially contacting force. At the state of the connectable and disconnectable position, the spreading quantity of the spring ring 24 is a maximum. Accordingly, both the radially contracting force and axially spreading force become maxima. Therefore, the boss member 5 and the set ring 12 cooperate through the spring ring 24. As a result, spline-phase adjusting at insertion of the shaft 6 into the boss member 5 can be made by holding the outer surface of the set ring 12. At the state of the lock position, the spreading quantity of the spring ring 24 is a minimum. Accordingly, both the radially contracting force and axially spreading force become minimum. Therefore, the rotation force of the set ring induced by the axially spreading force of the spring ring 24 becomes a minimum, and, accordingly, the boss member 5 and the set ring 12 do not cooperate through the spring ring 24 so that the set ring 12 is rotatable with respect to the boss member 5. Accordingly, in the case where external force acts on the outer surface of the set ring 12 in operation or, for example, in the case where a person's hand touches the outer surface of the set ring 12 by mistake, parts within the set ring 12, such as the shaft 6, the boss member 5 and the like, rotate but the set ring 12 safely stops.

Figure 31:
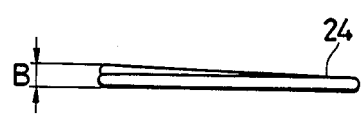
Figure 34:
Figure 35:
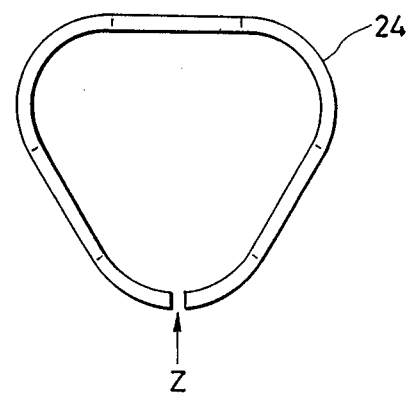
Figure 36:
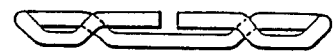

In order to secure the radial and axial force of the spring ring 24, the spring ring 24 may be formed as shown in FIGS. 35 and 36 by winding such a wavy wire rod as shown in FIG. 34 or by pressing the wound wire rod of FIG. 31. In this case, more preferably, the spring ring can more smoothly slide on the inclined surface and the boss member with no unstability.

As described above, according to the present invention, the set ring can be kept at the connectable and disconnectable position by the simple manual operation of axial moving the set ring. The set ring is continued to be at the connectable and disconnectable position if the manual grasping of the set ring is released. Furthermore, the set ring can be automatically shifted to the locking position when the shaft at the connectable and disconnectable position is inserted into or withdrawn from the hole of the boss member. Accordingly, connecting and disconnecting of the shaft can be made by such a simple operation. In addition, because the coupling device according to the present invention has a small number of parts and a simple structure, manufacturing and assembling thereof can be more simplified and connecting and disconnecting of the shaft can be made safely and securely.

What is claimed is:

1. A removable coupling device comprising:
a boss member having a hole axially extending inwards and a plurality of circumferentially spaced apertures radially extending to open into said hole, inclined surfaces being formed on an outer circumferential surface of said boss member so as to decrease a diameter of said boss member along an axial direction of said boss member in a direction extending axially away from said apertures;
a shaft having a set groove circumferentially extending around an outer surface thereof and being insertable into said hole of said boss member;
a plurality of locking elements individually radially movably disposed within said apertures such that said locking elements can partly extend inwards from said apertures so as to engage within said set groove of said inserted shaft to thereby prevent said shaft from escaping from said hole of said boss member;
a set ring axially movably disposed on said boss member to retain said locking elements at one of a first, locking position whereat said locking elements are engaged with said set groove of said shaft, and a second, connect/disconnect position whereat said locking elements are disengaged from said set groove so as to be radially outwardly movable; and
a spring ring partially engaging with a groove formed in an inner surface of said set ring, said spring ring having contracting force and being in forced contact with said boss member, whereby said spring ring slides on said inclined surfaces of said boss member so that said set ring automatically returns from said second, connect/disconnect position to said first, locking position when said shaft is inserted into or removed from said hole of said boss member.

2. A removable coupling device according to claim 1, in which said boss member is formed to be a cylindrical or polygonal pillar having at least two circumferentially formed inclined surfaces.

3. A removable coupling device according to claim 2, in which said spring ring has a slit, flat portions and corner portions, said flat portions and said corner portions respectively corresponding in number to said inclined surfaces.

4. A removable coupling device according to claim 2, in which said spring ring is formed to be a substantially circular shape having a slit and concavities corresponding in number to said inclined surfaces.

5. A removable coupling device according to claim 1, in which each of said inclined surfaces is formed to be a conical surface surrounding an entire circumference of said boss member.

6. A removable coupling device according to claim 5, in which said spring ring is formed to be a polygon, and in which each of said inclined surfaces is formed to be a conical surface surrounding an entire circumference of said boss member and being provided with at least one guide surface formed at least one portion on said inclined surface in parallel thereto so as to be engaged by flat portions or concavities of said spring ring.

7. A removable coupling device according to claim 5, in which said spring ring is formed to be a circle having a slit, and in which said inclined surfaces are formed entirely circumferentially conically with respect to the boss member and said coupling device further comprises an axially extending guide engagable with said slit.

8. A removable coupling device according to claim 1, in which said boss member is provided with at least one cylindrical portion formed in the area of said apertures or on an entire circumference of the area thereof.

9. A removable, coupling device according to claim 1, in which said boss member is provided with at least one concave portion formed in the area of said apertures or on an entire circumference of the area thereof.

10. A removable coupling device according to claim 1, in which said boss member is provided with at least one cut portion formed in the area of said apertures or on an entire circumference of the area thereof.

11. A removable coupling device according to claim 1, in which each of said inclined surfaces begins at the area of said apertures of said boss member.

12. A removable coupling device according to claim 1, in which each of said inclined surfaces begins at a position spaced from the area of said apertures of said boss member.

13. A removable coupling device according to claim 1, in which said set ring comprises:
 a support for radially supporting said locking elements respectively received within said apertures at said locking position where said locking elements engage with said groove of said shaft; and
 a casing formed separately from said support and for holding said support.

14. A removable coupling device according to claim 13, in which said support of said set ring is axially movably held by said casing, and in which a spring is disposed between an end portion of said casing and said support, said spring having axially spreading force.

15. A removable coupling device according to claim 1, in which said spring ring is formed to be a polygon or a circle having a slit, and in which opposite ends of said spring ring at said slit are staggered in width larger than the width of said groove of said set ring.

16. A removable coupling device according to claim 1, in which said spring ring is formed in a wavy shape.

17. A removable coupling device according to claim 1, in which said spring ring is axially engagable with said apertures and wherein said balls when engaging a portion of said shaft other than said set groove disengages said spring ring from said apertures.

* * * * *